US010074202B2

(12) United States Patent
Elkington et al.

(10) Patent No.: US 10,074,202 B2
(45) Date of Patent: Sep. 11, 2018

(54) BOREHOLE LOG DATA PROCESSING METHODS

(71) Applicant: Reeves Wireline Technologies Limited, Leicestershire (GB)

(72) Inventors: Peter Adrian Spencer Elkington, Loughborough (GB); Said Assous, Nottingham (GB); James Whetton, Nottingham (GB)

(73) Assignee: Reeves Wireline Technologies Limited, Leicestershire (GB)

( * ) Notice: Subject to any disclaimer, the term of this patent is extended or adjusted under 35 U.S.C. 154(b) by 0 days.

(21) Appl. No.: 15/386,353

(22) Filed: Dec. 21, 2016

(65) Prior Publication Data
US 2017/0103554 A1   Apr. 13, 2017

Related U.S. Application Data

(62) Division of application No. 14/020,191, filed on Sep. 6, 2013, now Pat. No. 9,697,620.

(30) Foreign Application Priority Data

Mar. 28, 2013  (GB) .................................. 1305791.4

(51) Int. Cl.
*G06T 11/20* (2006.01)
*E21B 49/00* (2006.01)
(Continued)

(52) U.S. Cl.
CPC ............ *G06T 11/206* (2013.01); *E21B 49/00* (2013.01); *G03B 37/005* (2013.01); *G06T 11/003* (2013.01); *E21B 47/01* (2013.01)

(58) Field of Classification Search
CPC ..... G03B 37/005; E21B 49/00; E21B 47/102; E21B 47/0002; E21B 47/01; G06T 11/003; G06T 11/206
See application file for complete search history.

(56) References Cited

U.S. PATENT DOCUMENTS 5,502,686 A * 3/1996 Dory ...................... G01V 11/00
                                                         175/40
2003/0139884 A1   7/2003 Blanch
(Continued)

FOREIGN PATENT DOCUMENTS

EP      0228231 A3      7/1987
GB      2474416         12/2012
(Continued)

OTHER PUBLICATIONS

Search Report 1 issued in Great Britain Application No. GB1305791.4 dated Feb. 18, 2014, 2 pages.
(Continued)

*Primary Examiner* — Michelle L Sams
(74) *Attorney, Agent, or Firm* — Blank Rome LLP

(57) ABSTRACT

A method of processing borehole log data to create one or more image logs involve modelling the log data as components of an image in the form $i(x, y)=l(x, y) \times r(x, y)$ (1), in which $i(x, y)$ is an image representative of the log data, $l(x, y)$ denotes an illumination value of the image at two-dimensional spatial co-ordinates x, y, and $r(x, y)$ denotes a surface reflectance value at the co-ordinates x, y. Equation (1) is transformed to a logarithmic domain, and a Fourier transform is obtained of the resulting logarithmic domain expression to obtain a Fourier domain expression. The Fourier domain expression is high-pass filtered, and an inverse Fourier transform is obtained of the resulting filtered Fourier domain expression. An exponential operation is performed on the result of inverse Fourier transform to obtain a filtered image model expression. Values of the filtered image model expression are mapped to respective color values across the range of the filtered image model expression values. The mapped color values can then be (Continued)

displayed, printed, saved and/or transmitted as one or more image logs.

10 Claims, 8 Drawing Sheets

(51) Int. Cl.
*G03B 37/00* (2006.01)
*G06T 11/00* (2006.01)
*E21B 47/01* (2012.01)

(56) References Cited

U.S. PATENT DOCUMENTS

| | | |
|---|---|---|
| 2007/0071350 A1 | 3/2007 | Lee et al. |
| 2010/0040259 A1* | 2/2010 | Morris .................. G01V 11/00 382/109 |
| 2012/0272724 A1* | 11/2012 | Hollmann ................ G01V 3/38 73/152.15 |
| 2012/0301050 A1 | 11/2012 | Wakazono |
| 2013/0054201 A1 | 2/2013 | Posamentier |
| 2013/0235696 A1 | 9/2013 | Larsen et al. |
| 2013/0286782 A1 | 10/2013 | Vyas |

FOREIGN PATENT DOCUMENTS

| | | |
|---|---|---|
| GB | 2501369 A | 10/2013 |
| WO | 2009026979 A1 | 3/2009 |
| WO | 2010019731 A2 | 2/2010 |
| WO | 2012085163 A1 | 6/2012 |

OTHER PUBLICATIONS

Search Report 2 issued in Great Britain Application No. GB1305791.4 dated Feb. 18, 2014, 2 pages.
Search Report received in corresponding GB Application No. GB1305791.4, dated Sep. 18, 2013.
Williams, J.H., and Johnson, C.D., "Acoustic and optical borehole-wall imaging for fractured-rock aquifer studies," Journal of Applied Geophysics, 2004, vol. 55, Issue 1-2, p. 151-159.
U.S. Appl. No. 61/620,341, entitled "System and Method for Optimal Stacking of Seismic Data," filed Apr. 4, 2012.

* cited by examiner

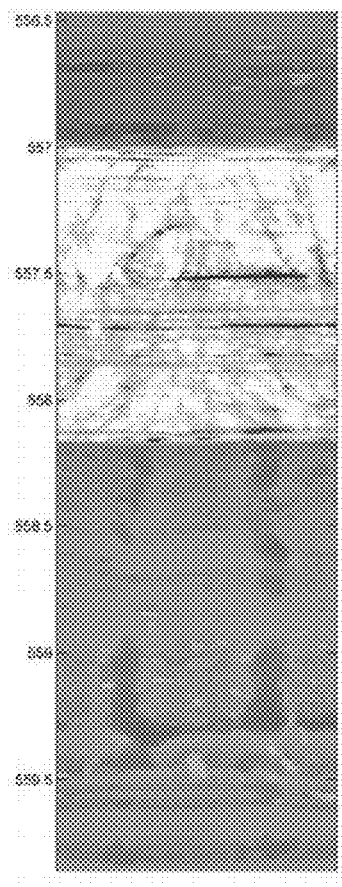 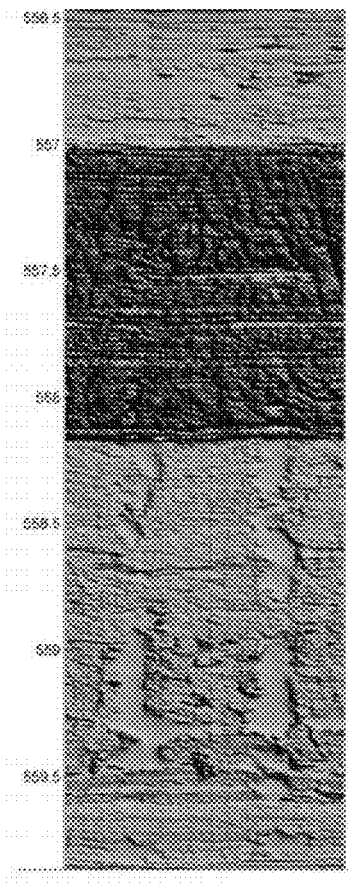 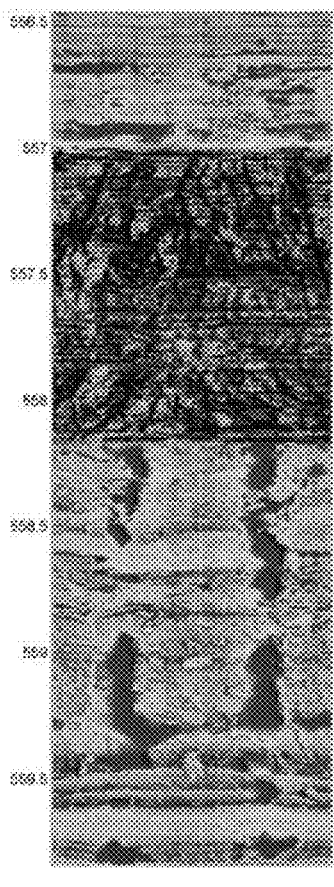
*Figure 8a*     *Figure 8b*     *Figure 8c*

BOREHOLE LOG DATA PROCESSING METHODS

CROSS-REFERENCE TO RELATED APPLICATIONS

This is a divisional of U.S. application Ser. No. 14/020,191, filed 6 Sep. 2013, which is incorporated herein by reference.

FIELD OF THE DISCLOSURE

The invention relates to improved borehole log data processing methods.

BACKGROUND OF THE DISCLOSURE

The logging of geological formations is, as is well known, economically a highly important activity. The invention is of benefit in logging activities potentially in all kinds of mining and especially in the logging of reserves of oil and gas, water or other valuable commodities.

Virtually all commodities used by mankind are either farmed on the one hand or are mined or otherwise extracted from the ground on the other, with the extraction of materials from the ground providing by far the greater proportion of the goods used by humans.

It is extremely important for an entity wishing to extract materials from beneath the ground to have as good an understanding as possible of the lithology of a region from which extraction is to take place.

This is desirable partly so that an assessment can be made of the quantity and quality, and hence the value, of the materials in question; and also because it is important to know whether the extraction of such materials is likely to be problematic.

In consequence a wide variety of logging methods has been developed over the years. The logging techniques exploit physical and chemical properties of a formation usually through the use of a logging tool or sonde that is lowered into a borehole (that typically is, but need not be, a wellbore) formed in the formation by drilling.

Typically the sonde sends energy into the formation and detects the energy returned to it that has been altered in some way by the formation. The nature of any such alteration is processed into electrical signals that are then used to generate logs (i.e. numerical, graphical or tabular representations containing much data about the formation in question).

The signals may be thought of as log data, or at least as representing log data. These data may be stored, processed and transmitted as numerical values e.g. in a database or other data memory format; or they may be processed to form graphical logs referred to as image logs.

In general the values of the log data when converted to forms that are useable in image logs are represented by features of the image logs that a skilled analyst can interpret by eye in order to assess the conditions in the downhole (i.e. subterranean) environment.

Taking the specific example of resistivity log data, when these are converted to image format the data values are mapped to colours that may then be viewed e.g. on a computer screen or in a colored print-out. It has been found that the use of colours in this way is somewhat intuitive for human analysts to study. In a resistivity image log that has not undergone any processing that alters the scale from place to place in the image therefore the analyst can know with confidence that all regions of the image that are the same color represent regions, of the formation, that are of the same resistivity.

Log data from other types of logging tool may be similarly processed in order to give rise to other kinds of image log.

In short therefore an image log appears as lines and regions of color that represent the shapes and distributions of subterranean features.

It is important in this regard to recognise that the logging sondes do not themselves either illuminate the subterranean formations or indeed capture light-based images. Rather, the log data (that by reason of resulting from penetration by the emitted energy of the geological features surrounding the borehole may relate to locations spaced some distance into the rock from the borehole) may be processed into images in order to facilitate interpretation of the data.

A topic of growing interest is that of machine assessment of log data. In particular the Applicant has pioneered numerous techniques that assist to automate processes of image log interpretation, thereby saving significantly on costs and time. In particular the Applicant has developed highly effective techniques that render image logs suitable for automated analysis; and also has developed highly effective automatic feature recognition and analysis methods.

Despite these advances however some aspects of log data and image logs derived from them remain sub-optimal, as explained below. The methods of the invention seek to improve the processing of image log data so that they more readily can be interpreted (whether by automated machinery such as computers, or by humans).

In part the difficulties derive from techniques of normalization (i.e. the assignment of the log data values to the range of colours available for inclusion in an image log) that are currently in use.

Normalization in the context of image log processing is the transformation of the measured values to a color scale. In respect of micro-resistivity images the convention is to represent low resistivity values by black and high resistivity values by white, with a gradational "earth-tones" color scale between. Typical scales comprise 64 or 128 colours (the human eye having limited ability to differentiate between adjacent colors on gradational scales of more than 128 colours).

Normalization techniques fall broadly into two categories: static normalization and dynamic normalization.

In static normalization a fixed relationship exists between resistivity values and color defined for the entire well. The desired maximum and minimum resistivity values for the scale are defined, and the interval is divided either linearly or logarithmically into the number of bins in the color scale. Static scales allow the gross similarities between intervals to be readily identified. The disadvantage is that the resistivity of rocks spans several orders of magnitude, so small but significant variations in resistivity within a narrow band are not rendered with this method.

As the name implies, in dynamic normalization a dynamic relationship exists between resistivity values and colors in which the color mapping applied to each depth frame is driven by the range of resistivity values in a depth window centered on the depth. The depth window is typically of the order of 1 m. All 64 (or 128) colors are used within each window, so the small but significant variations in resistivity that are lost in static images are rendered in a dynamic image. The disadvantage is that the same color from different parts of the same well will not in general correspond to the same resistivity value.

In more detail, dynamic normalization may be implemented (for example) by computing the mean and standard deviation of the resistivity values in a window, then mapping the color range to the resistivity range (mean−n×standard deviation) to (mean+n×standard deviation). A common alternative dynamic normalization (referred to as equalization) redistributes resistivity values within the depth window so as to achieve a linear cumulative distribution of normalized resistivity values.

A further aspect of dynamic normalization is that none of the prior art dynamic normalization methods takes account of the spatial distribution of the resistivity values within the window. This means that the color mapping applied to the depth frame at the central depth in the window is influenced by resistivity values elsewhere in the window, and this has the potential to create ghosts when the window contains high-contrast transitions. As used herein a "ghost" is a region of an image log created using one of the artificial log data to color mapping techniques in which one color may inaccurately spread into a region of the image that does not exhibit the log data value in question. Ghosting therefore leads to significant inaccuracies, and the loss of some features from the image logs altogether.

It is important to recognise some further features of image logs that while not necessarily disadvantages must be borne in mind when considering them.

Firstly image logs are usually colored, with (as explained) the colors signifying data values such as micro-resistivity values that either apply over the entirety of an image log (in the case of a statically normalized log) or within respective depth windows (in the case of dynamically normalized logs).

Image logs however can with some success be rendered in grayscale. The images herein are so rendered but it is to be understood that the method of the invention is not limited to the production of grayscale images and instead is intended to be applicable to, and indeed is primarily applicable to, colored image logs.

Secondly if it is required to produce logs that are suitable for automated (machine) processing it is desirable to carry out some form of pre-processing on the image logs to render them suitable for this use.

An example of the kind of pre-processing that the Applicant has developed is so-called "in-painting."

In-painting is a technique that is applicable to resistivity logs, and to logs created from multiple sub-components that need not necessarily be logged at one and the same time.

An example of a logging tool type is the so-called multi-pad micro-resistivity borehole imaging tool, such as the tool 10 illustrated in transversely sectioned view in FIG. 1. In this logging tool a circular array of (in the example illustrated) eight pads 11 each in turn supporting typically two lines of surface-mounted resistivity electrodes referred to as "buttons" 12 is supported on a series of calliper arms 13 emanating from a central cylinder 14. During use of the tool 10 the arms 13 press the buttons 12 into contact with the very approximately cylindrical wall of a borehole. The borehole is normally filled with a fluid (such as a water-based mud) that if conductive provides an electrical conduction path from the formation surrounding the borehole to the buttons.

Many variants on the basic imaging tool design shown are known. In some more or fewer of the pads 11 may be present. The numbers and patterns of the buttons 12 may vary and the support arms also may be of differing designs in order to achieve particular performance effects. Sometimes the designers of the tools aim to create e.g. two parallel rows of buttons located on the pad one above the other. The buttons in the lower row are offset slightly to one side relative to their counterparts in the row above. When as described below the signals generated by the buttons are processed the outputs of the two rows of buttons are in effect lain over one another. As a result the circumferential portion of the borehole over which the buttons 12 of a pad 11 extend is logged as though there exists a single, continuous, elongate electrode extending over the length in question.

In general in operation of a tool such as resistivity tools 10 electrical current generated by electronic components contained within the cylinder 14 spreads into the rock and passes through it before returning to the pads 11. The returning current induces electrical signals in the buttons 12.

Changes in the current after passing through the rock may be used to generate measures of the resistivity or conductivity of the rock. The resistivity data may be processed according to known techniques in order to create (typically colored) image logs that reflect the composition of the solid and fluid parts of the rock. These image logs convey much data to geologists and others having the task of visually inspecting and computationally analyzing them in order to obtain information about the subterranean formations.

In use of a tool such as that shown in FIG. 1 the tool is initially conveyed to a chosen depth in the borehole before logging operations commence. The deployed location may be many thousands or tens of thousands of feet typically but not necessarily below, and in any event separated by the rock of the formation from, a surface location at which the borehole terminates.

Various means for deploying the tools are well known in the mining and oil and gas industries. One characteristic of most if not all of them is that they can cause a logging tool that has been deployed as aforesaid to be drawn from the deployed location deep in the borehole back towards the surface location. During such movement of the tool it logs the formation, usually continuously. As a result the image logs may extend continuously for great distances.

Although the logs are continuous in the longitudinal sense, notwithstanding the pad offsetting explained above they are azimuthally interrupted by reason of the pads not extending all the way continuously around the circumference of the borehole. The design of the tool prevents this since the arms 13 must be extensible in order to press the pads 11 into contact with the borehole wall. Following extension of the arms there exists a series of gaps between the ends of the pads.

No data can be logged in these gaps, which manifest themselves as elongate spaces in the image logs. Example of image logs including several of these gaps or discontinuities are visible in FIGS. 6 and 7a. The discontinuities extend from one end of the reconstructed image log to the other, a distance in some cases of thousands of feet.

Filling in the missing data is advantageous for obvious reasons of the desirability of completeness of information. Moreover it is likely to be required when it is desired to process the image logs using automatic pattern recognition programs in order to try and identify certain features in the logs.

Patent application no. GB 1210533.4 discloses an in-painting technique, the purpose of which is to fill in, in a realistic manner, the discontinuities that result from use of a resistivity imaging tool of the kind illustrated in FIG. 1.

Such in-painting is an example of the kind of pre-processing technique that may be applied to image log data.

SUMMARY OF THE DISCLOSURE

The methods of the invention are applicable to log data that has undergone pre-processing such as that outlined above, or perhaps another kind of pre-processing. Equally, however, the methods of the invention are applicable to, and useful in respect of, log data that have not undergone pre-processing.

Furthermore the methods of the invention are applicable both to image logs that are intended for analysis by humans and those that are intended for machine analysis. For the avoidance of doubt the human and machine analysis approaches often are not mutually exclusive in one and the same log.

Yet further for the avoidance of doubt, the methods of the invention extend to the processing of data in real time as it is generated for example using an imaging tool as described above (or another type of logging tool). It also extends to the processing of data the generation of which was not contemporaneous with the log data processing steps. Thus the methods of the invention are applicable to e.g. so-called logging while drilling (LWD) data or other real-time generated data; or data the production of which is not contemporaneously associated with operation of a logging tool.

As stated below, the steps of operating a logging tool therefore optionally form part of the invention.

According to the invention in a first aspect there is provided a method (1) of processing borehole log data, to create one or more image logs, comprising the steps of:

a. Modelling the data as components of an image in the form $$i(x,y)=l(x,y) \times r(x,y) \quad (1)$$

in which i(x, y) is an image representative of the log data; l(x, y) denotes an illumination value of the image at two-dimensional spatial co-ordinates x, y; and r(x, y) denotes a surface reflectance value at the co-ordinates x, y;

b. Transforming Equation (1) to a logarithmic domain;
c. Obtaining a Fourier transform of the resulting logarithmic domain expression to obtain a Fourier domain expression;
d. High-pass filtering the Fourier domain expression;
e. Obtaining an inverse Fourier transform of the resulting filtered Fourier domain expression;
f. Performing an exponential operation on the result of Step e. to obtain a filtered image model expression;
g. Mapping values of the filtered image model expression to respective color values across the range of the filtered image log expression values; and
h. Displaying, printing, saving and/or transmitting the mapped color values as one or more image logs.

Such a method advantageously separates in the logarithm domain the illumination values and reflectance values in the log data thereby permitting selective filtering in order to provide an enhanced log in which the effects of the log data components that are modelled as illumination values are reduced. In such a log the dynamic range of the image log is extended compared with a normally processed image log, so that more information may be rendered using a fixed color scale.

Optional, advantageous features of the first aspect of the invention (Method 1) are set out as follows:

Method (2). The method (1) wherein Step b includes performing a natural logarithm (base e) transform and adding a positive integer value to the logarithmic domain expression such that the result of Step b is a logarithmic domain expression of the form $z(x, y)=\ln(i(x, y)+1)=\ln(l(x,y) \times r(x, y)+1)=\ln(l(x,y))+\ln(r(x, y))$.

Method (3). The method (1) or (2) wherein the result of Step c. is an expression of the form $\Im[z(x, y)]=\Im[\ln(l(x, y))]+\Im[\ln(r(x, y))]$.

Method (4). The method (3) including the sub-step of expressing Equation 3 as $Z(\mu, v)=L(\mu, v)+R(\mu, v)$.

Method (5). The method (4) wherein Step d. includes high pass filtering $Z(u, v)$ using a filter function $H(u, v)$ to produce a filtered Fourier transform domain expression of the form $S(\mu, v)=H(\mu, v) \times L(\mu, v)+H(\mu, v) \times R(\mu, v)$.

Method (6). The method (5) wherein the filter function $H(u, v)$ is defined by $$H(\mu, v) = \frac{1}{1 + \left[\frac{D_0}{D(\mu, v)}\right]^{2n}},$$

in which n signifies the order of the filter and $D_0$ specifies the filter band cut-off as a value of the distance from the centre frequency passed by the filter of the boundary of the cut-off.

Method (7). The method (6) wherein the value of $D_0$ at co-ordinates u, v is given by the expression $$D(\mu, v) = \left[\left(\mu - \frac{M}{2}\right)^2 + \left(v - \frac{N}{2}\right)^2\right]^{1/2}.$$

Method (8). The method (5 to 7) wherein Step e. gives rise to an expression of the form $s(x, y)=\Im^{-1}\{H(u, v) \times L(\mu, v)\}+\Im^{-1}\{H(\mu, v) \times R(\mu, v)\}$.

Method (9). The method (8) wherein Step f. gives rise to a filtered image component $\hat{\imath}(x, y)=e^{s(x,y)}-1$.

The method may be carried out in respect of all the data contributing to an image log, in which case the method is a substitute for static normalization as described above. In such a case the background colors of the image generally represent the same resistivity values across all the log data (which may correspond to many feet of logged well), with dynamic normalization characteristics being apparent only in respect of thin, small-scale geological features. Thus the method of the invention permits the generation of image logs that are essentially similar to statically normalized ones, but with enhanced detail and information in areas corresponding to particularly fine or otherwise difficult to resolve features.

This simulated combination of static and dynamic normalization characteristics in one and the same image log is likely to be of very significant benefit in the interpreting of image logs.

Alternatively the method may be applied on a sliding window basis, which concept is broadly familiar to those of skill in the image logging art. Thus in embodiments of the method of the invention the log data relate to a depth window corresponding to less than the whole depth of the logged data, and the method includes repeating the steps of any preceding feature in respect to at least one further depth window in the logged data.

When so practised the method of the invention optionally may include the step of i. analyzing the spatial distribution of log values within each said depth window, and excluding from the data processed in accordance with Steps a. to h. data identified as being of high contrast.

The method of the first aspect of the invention may be termed "dynamorphic filtering", which is intended to convey both the notion of filtering of image log data to remove the illumination value component and the concept of dynamic normalization at places in which the geological features would otherwise be difficult to resolve. The extent to which the dynamic aspect is applied occurs automatically as a result of the algorithm used.

According to a second aspect of the invention there is provided a method of processing borehole log data, to create one or more image logs, comprising the steps of:

j. Modelling the log data as components of an image;

k. Specifying positional parameters of a virtual light source as azimuthal and elevation angles;

l. Selecting the set of pixels corresponding to the azimuthal angle:

m. Computing a one-dimensional derivative of a sub-set of pixels corresponding to this orientation, in which the sub-set is selected based on the elevation angle;

n. Shading the image as though the light source illuminates the image at the elevation and azimuthal angles; and o. Displaying, printing, saving and/or transmitting the shaded image.

This aspect of the method of the invention may be carried out on its own, or in combination with the steps of the first aspect of the invention. In either case an enhanced image log results.

According to a further aspect of the invention there is provided a method of processing borehole log data, to create one or more image logs, comprising the steps of modelling the data as components of an image; creating multiple versions of the image having respectively differing static scales; and combining the multiple image versions to create a composite image.

Thus the third aspect of the invention amounts to the application of techniques akin to those known in the image processing art as high dynamic range (HDR) processing to image log data. Further enhancements to the qualities of image logs result from the application of this aspect of the invention.

Regardless of the aspect of the invention made use of, preferably the log data are resistivity log data and/or acoustic log data (especially ultrasound log data) and/or nuclear log data.

Also preferably the method of the first aspect of the invention additionally includes histogram equalisation.

Conveniently the methods of the invention include the steps of operating a logging sonde to energise a geological formation; receiving returned energy at the sonde; from the returned energy generating one or more signals; and transmitting or storing the signals as the borehole log data.

The steps of the methods may be carried out using a programmed computer or processor.

In addition to the foregoing the invention is considered to reside in one or more of:

a computer or processor that is programmed to perform the steps of a method in accordance with any of the disclosed methods hereof;

such a computer or processor when operatively connected to a logging sonde;

such a computer or processor when housed within a logging sonde, or connected as part of a logging toolstring including a sonde;

log data processed in accordance with the methods hereof; and/or image logs produced in accordance with the methods hereof.

BRIEF DESCRIPTION OF THE DRAWINGS

There now follows a description of preferred embodiments of the invention, by way of non-limiting example, with reference being made to the accompanying representations in which:

FIGS. 8a to 8c are grayscale representations of comparisons between statically normalized, in-painted log data (FIG. 8a), virtual light source treated data (FIG. 8b), and log data (FIG. 8c) that have been the subject of combined treatment in accordance with the method of both the first and the second aspects of the invention;

FIG. 9b shows the output of the method of the third aspect of the invention, resulting from combining the images in FIG. 9a.

Figure 1:
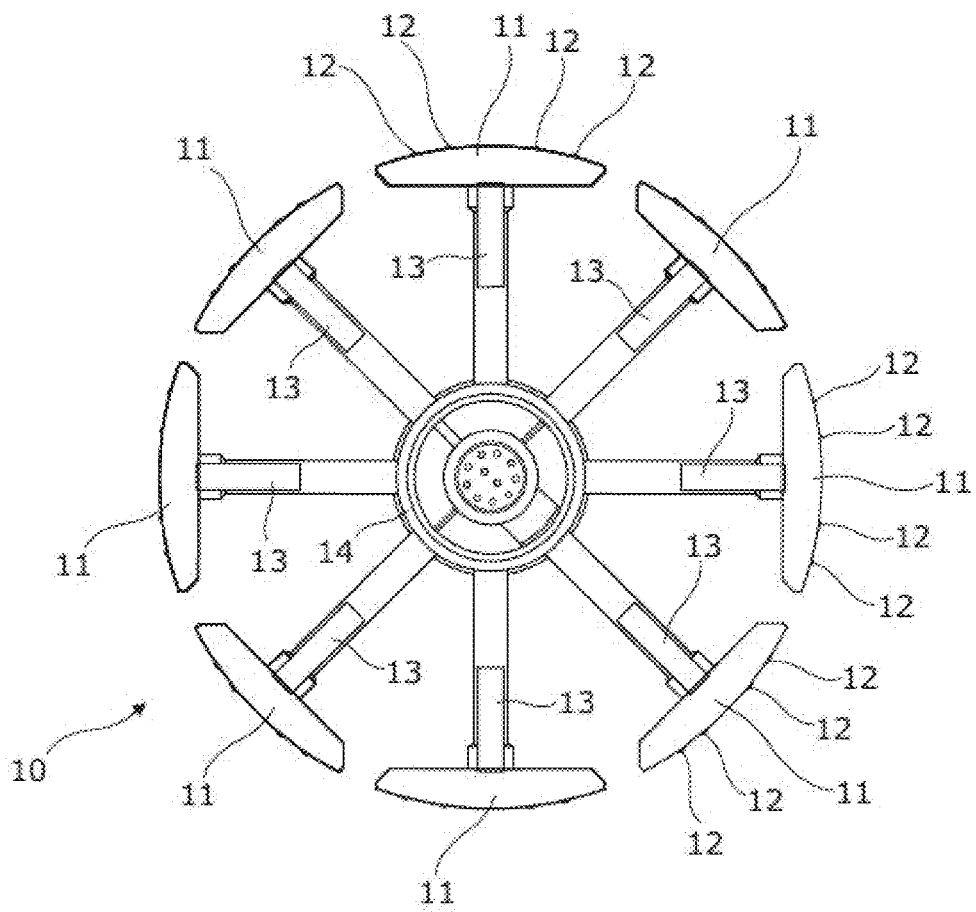
FIG. 1 is a schematic, partly sectioned representation of a prior art micro-resistivity logging tool.

For the avoidance of doubt where in this specification grayscale images are shown this is for ease of illustration. It would be expected in the majority of cases of use of the methods of the invention that colored image logs would be the normal output.

DETAILED DESCRIPTION

Referring to the representations, the methods of the invention are described in the following sections, in which the sub-headings indicate the various aspects of the invention.

Illumination-Reflectance Model

An image can be considered as a 2D function of the form $i(x, y)$, the value of which at spatial coordinates $(x,y)$ is a positive scalar quantity the physical meaning of which is determined by the source of the image. In the case of grayscale images, when an image is generated from a physical process its values are proportional to energy radiated by a physical source. In other words, an image is an array of measured light intensities that are a function of the amount of light reflected off the objects in the scene.

The intensity is a product of illumination (the amount of source illumination incident on the scene being viewed) and reflectance (the amount of illumination reflected by the objects in the scene). Note that this is still valid for resistivity log images, even though as explained they are not optical images. Denoting illumination as l(x, y) and surface reflectance as r(x,y), then an image i(x, y) can be expressed as:

$$i(x,y)=l(x,y)\times r(x,y) \quad (1)$$

The model of image formation in Equation (1) is known as the illumination-reflectance model. It is a simplification of the general model in which the specular reflection, the directly visible light source, and caustics are ignored. This simplification does not hold in general, but it is useful for explaining the principles of the invention. The model can be used to address the problem of improving the quality of an image that has been acquired under poor illumination conditions, but in the context of the invention it is used, as explained herein, to improve the dynamic range of borehole resistivity images.

If i(x, y) is given it may be impossible to retrieve either of its constituent components, l(x, y) or r(x,y). However, for certain applications (including tone reproduction) it may be desirable to separate surface reflectance from signal. Although this is generally an under-constrained problem, it is possible in accordance with the invention to transform Equation (1) to the log domain, where the multiplication of r(x,y) and l(x, y) becomes an addition. Then under specific conditions the two components could be separated. An image represented in the logarithmic domain is referred to as a density image. The fact that the two entities are added in the logarithmic domain gives a direct result to operate in the log domain. Filtering operations such as tone reproduction may be carried out in this domain. Such processes are referred to herein as dynamorphic filtering.

Dynamorphic Filtering Concept

The dynamorphic concept combines the illumination-reflectance model with the concept of the ghost-free dynamic normalization described above.

Illumination results from the conditions present when the image is captured, and can change when these conditions change (for example, when the borehole environment changes). Illumination variations can be thought of as multiplicative noise, and can be reduced by filtering in the log domain. However, reflectance results from the way the objects in the image reflect light (in the case of a resistivity log it is current flowing in the rock), and is determined by the intrinsic properties of the object itself, which (in this theoretical analysis) do not change.

One may consider that illumination varies slowly in space (slow spatial changes ↔ low spatial frequency) while reflectance changes abruptly (high spatial frequencies). When seeking to eliminate apparent changes in the resistivity image appearance with changes in lighting conditions, it is desirable to enhance the reflectance while reducing the contribution of illumination. Hence, it is desirable to separate the two components of Equation (1) and then high pass filter the resulting image in the frequency domain. Dynamorphic filtering as defined herein is a frequency domain filtering process that achieves this objective by transforming the expression in Equation (1) from multiplication to addition, the problem of high pass filtering then being made trivial as it becomes possible to use the multiplication or convolution property of the Fourier transform $\Im$.

A solution to this problem, within the scope of the invention, is to take a natural logarithm (base e) of both sides of Equation (1):

$$z(x,y)=\ln(i(x,y)+1)=\ln(l(x,y)\times r(x,y)+1)=\ln(l(x,y))+\ln(r(x,y)) \quad (2)$$

where the +1 is added to make sure the situation ln(0) does not arise. Applying the Fourier transform to Equation (2)

$$\Im[z(x,y)]=\Im[\ln(l(x,y))]+\Im[\ln(r(x,y))] \quad (3)$$

$$\text{or: } Z(\mu,v)=L(\mu,v)+R(\mu,v) \quad (4)$$

where L(µ, v) and R(µ, v) are the Fourier transforms of ln(l(x, y)) and ln(r(x, y)), respectively. Now it is possible to high pass filter Z(µ, v) by means of a filter function H(µ, v) in the frequency domain and obtain a filtered version S(µ, v):

$$S(\mu,v)=H(\mu,v)\times Z(\mu,v)$$

$$S(\mu,v)=H(\mu,v)\times L(\mu,v)+H(\mu,v)\times R(\mu,v) \quad (5)$$

Taking an inverse Fourier transform of Equation (5) provides:

$$s(x,y)=\Im^{-1}\{H(\mu,v)\times L(\mu,v)\}+\Im^{-1}\{H(\mu,v)\times R(\mu,v)\} \quad (6)$$

and finally, one may achieve the desired filtered (enhanced) image $\hat{i}(x, y)$ by the exponential operation:

$$\hat{i}(x,y)=e^{s(x,y)}-1 \quad (7)$$

Figure 2:
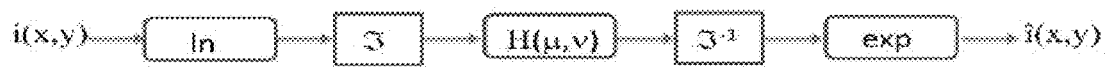
FIG. 2 is a flow chart summarising the method of the first aspect of the invention.

The preferred high pass filter normally used in this procedure is the Butterworth filter defined as:

$$H(\mu, v) = \frac{1}{1+\left[\frac{D_0}{D(\mu, v)}\right]^{2n}} \quad (8)$$

where n defines the order of the filter. $D_0$ is the cut-off distance from the center and D(µ, v) is given by:

$$D(\mu, v) = \left[\left(\mu - \frac{M}{2}\right)^2 + \left(v - \frac{N}{2}\right)^2\right]^{1/2} \quad (9)$$

where M and N are the number of rows and columns of the original image, respectively. The whole process is summarized in FIG. 2.

In the case of borehole resistivity images, the dynamorphic filtering process preferably is followed by a classical histogram equalisation for further improvement.

Enhancement algorithms such as histogram equalisation and dynamorphic filtering as defined and claimed herein are global in nature and are intended to enhance an image and deal with it as a whole. For resistivity images, it is in the alternative possible within the scope of the invention to apply the two algorithms on a windowing basis by splitting the original image in sub-images and filtering each sub-image individually.

In summary, dynamorphic normalization (or dynamic range improvement) seeks to increase the amount of useful information that can be rendered by a fixed color scale. It may be applied to the whole well, or on a sliding window basis. When applied to the whole well it is an alternative to the prior art conventional static image normalization. When applied on a window basis, it is an alternative to conventional dynamic normalization and/or dynamic equalization.

Figure 3:
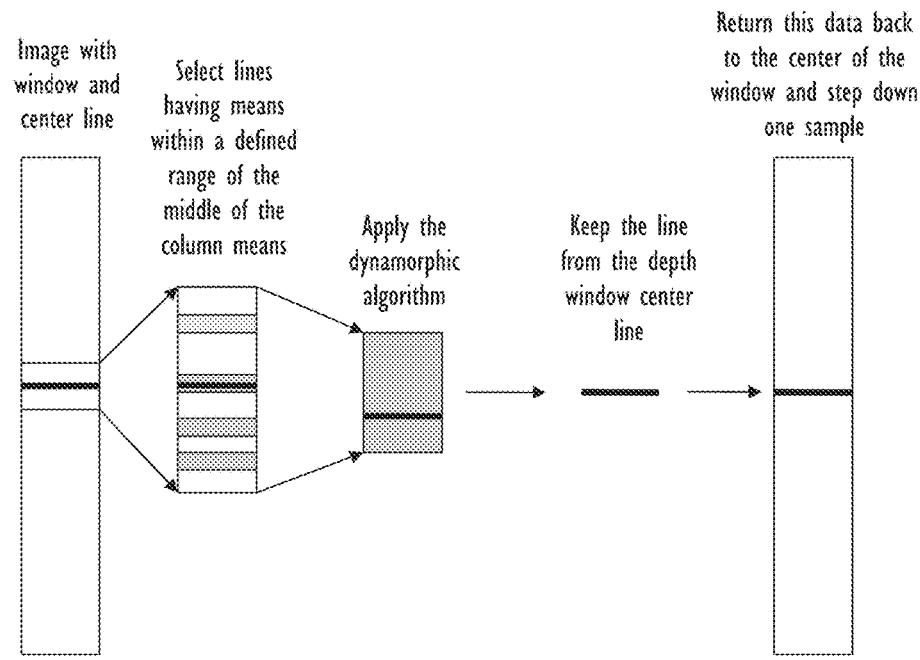
FIG. 3 is a schematic representation of the steps of an optional windowing process used when applying the method of the first aspect of the invention to resistivity image log data.
Figure 4:
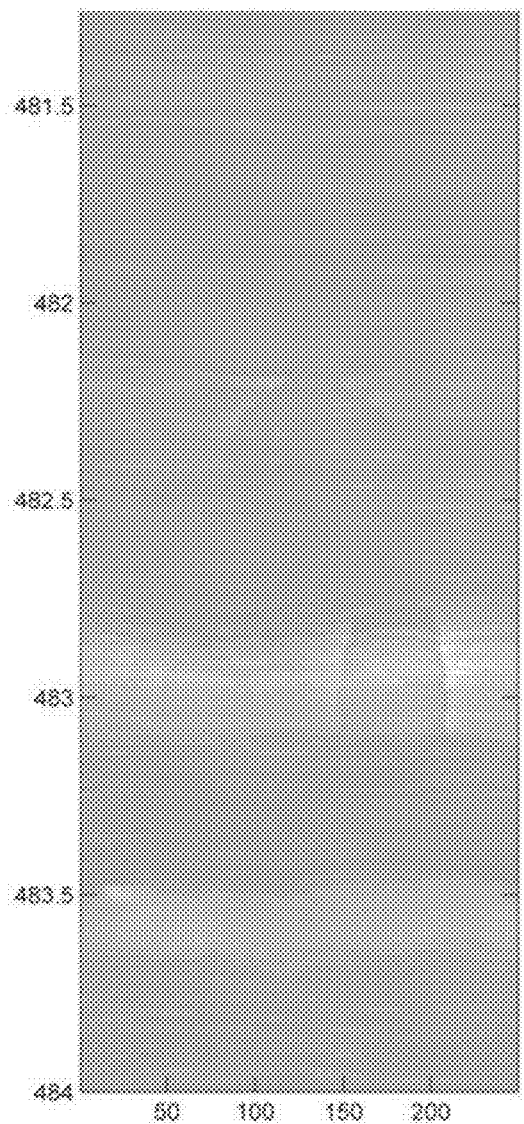
FIG. 4 shows in grayscale a prior art statically normalized resistivity image log.
Figure 5:
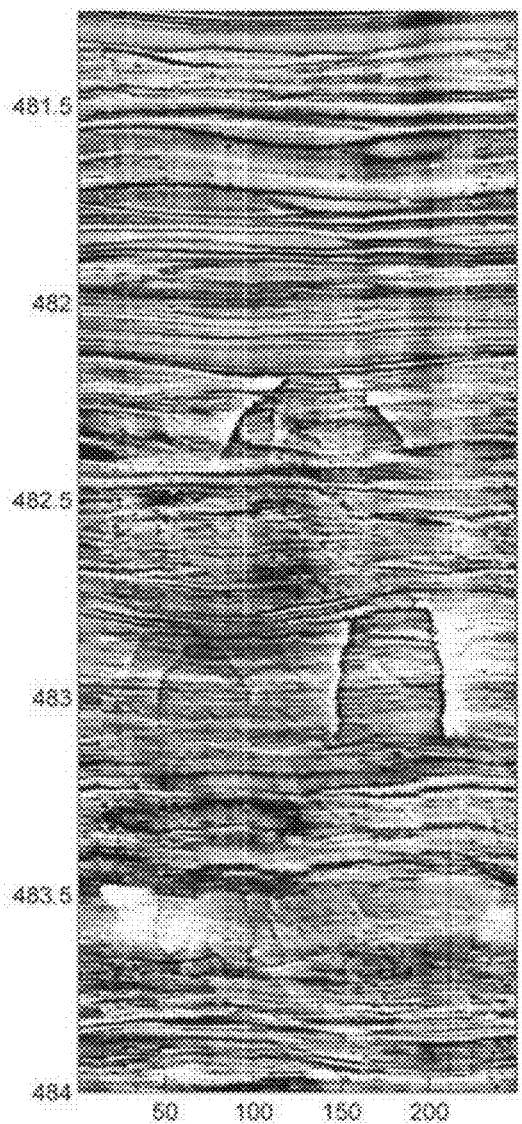
FIG. 5 shows in grayscale a resistivity image log that is the result of processing the log data of FIG. 4 in accordance with the method of the first aspect of the invention.
Figures 6A, 6B, 6C, 6D, 6E:
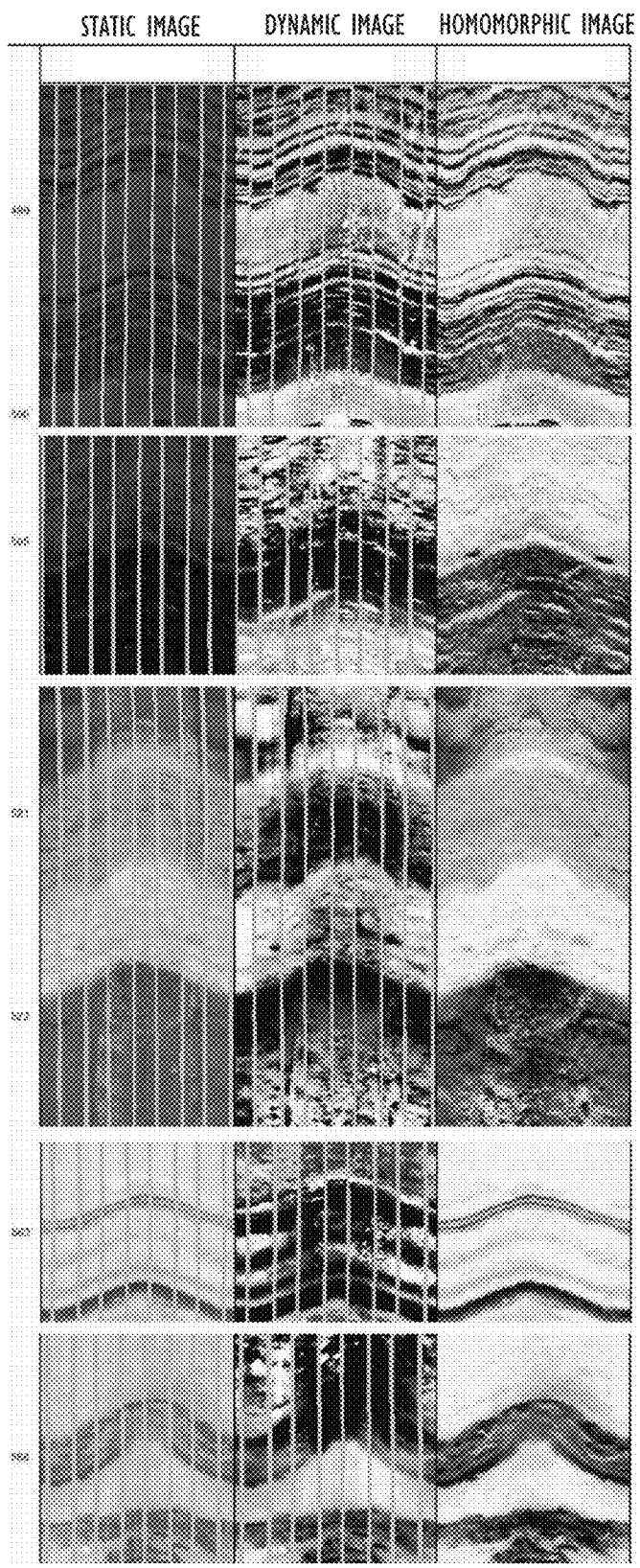
FIGS. 6a to 6e are grayscale representations of comparisons between exemplary outputs of the method of the invention with statically and dynamically normalized (prior art method) image logs.

The sliding window approach is illustrated schematically in FIG. 3, and may be summarised as follows:

The algorithm comprises the following steps:
Select a depth window;
Compute column means within that window;
Select the middle value from the mean values vector;

Retain lines in the window the means of which are within a defined range of the middle value of the vector of means.

Apply the dynamorphic filtering method described above on the retained data, keeping only the line corresponding to the center line from the depth window;

Go to the next depth line, and repeat;

After completing for the whole file, normalize the result to 64 colors.

This set of steps has the beneficial effect of removing high-contrast data.

Implementation of Dynamorphic Filtering Additionally to Exclude Gradient Artefacts Conventional dynamic normalization produces spurious color gradients adjacent to boundaries with high resistivity contrast. This is because high contrast boundaries cause a sudden change in the window-average resistivity that controls the normalization, and the change falls away only gradually away from the boundary. The method of the invention addresses this problem in the way it implements the Dynamorphic Normalization algorithm. Specifically the method considers the spatial distribution of resistivity values within the depth window, and excludes high contrast data from the average while applying the dynamorphic filtering within that window.

The artefact suppression is demonstrated in FIGS. 6a to 6e in which it is compared with the industry-standard dynamic normalization as presently implemented in existing software such as Well Imager provided by Weatherford International.

In each of FIGS. 6a to 6e the left hand track shows a resistivity image log that has been the subject of (prior art) static normalization; the center track the same log data following treatment using a prior art dynamic normalization method; and the right hand track the log data having been processed in accordance with the method of the first aspect of the invention.

In the left hand and center tracks the occlusions resulting from operation of a micro-resistivity logging tool as described above are apparent as vertical lines in which no data are present. In the right hand track there are no occlusions because the data have been subject to a process of filling in the missing data lines. As stated however the method of the invention is applicable to log data that includes the occlusions or has been the subject of a process having the aim of eliminating them.

The following remarks, that relate as indicated below to the respective images 6a to 6e, identify the defects of the images that are not the result of data processing in accordance with the method of the invention, and also explain how the method of the invention produces improved results:

FIG. 6a

The dynamic image misrepresents the thin beds. The dynamorphic image matches the optimally scaled static in this interval while also matching differently scaled static images in other intervals.

FIG. 6b

The dynamorphic (inventive) image has more detail in the thinly bedded intervals (ignoring the residual speed correction artefacts).

FIG. 6c

The dynamic image has introduced beds that do not exist in reality (as confirmed in the static image). All the features in the dynamorphic image are real, and better defined.

FIG. 6d

The dynamic image introduces false "shadows" below high-contrast boundaries, and adds other detail that is not real.

FIG. 6e

The dynamic image corrupts the central bed and introduces other distortions. The dynamorphic image improves on the dynamic and static images.

In general the images in the right hand track of FIGS. 6a to 6e tend to appear similar to those of the left hand track; but this is illusory. In view of the variable application of a dynamic scaling effect that takes place as a result of the inventive method the right hand track logs in fact exhibit significantly greater detail and accuracy at locations where this is required.

The center track of FIGS. 6a to 6e graphically illustrates the phenomenon of "ghosting", in which certain color scales spread to occupy areas beyond those corresponding to the log (resistivity) values they are intended to represent. This in turn derives from the fact that in a dynamically normalized image log one color scale may represent more than one log value. Very clearly the phenomenon of ghosting renders the log considerably harder for either a human analyst or a computer to interpret correctly than should be the case.

Virtual Light Source (VLS)

Research has shown that the way data are visualized has a bearing on how the eye-brain system perceives the information. In particular it has been found that the brain perceives low and high spatial frequencies differently, and whereas color is useful for displaying low-frequency variations in data, it is not well-suited to the display of high-frequency data. The latter is best displayed using variations in luminosity.

The method of the second aspect of the invention involves treating high spatial frequencies differently, and include a Virtual Light Source (VLS) algorithm which consists of:

Specifying a "light source" position in terms of its azimuthal and elevation angles.

Selecting the set of pixels corresponding to the azimuthal angle.

Computing a one-dimensional derivative of a sub-set of pixels corresponding to this orientation, in which the sub-set is selected based on the elevation angle.

Outputting the shaded image within these azimuthal and elevation angles.

Figures 7A, 7B, 7C:
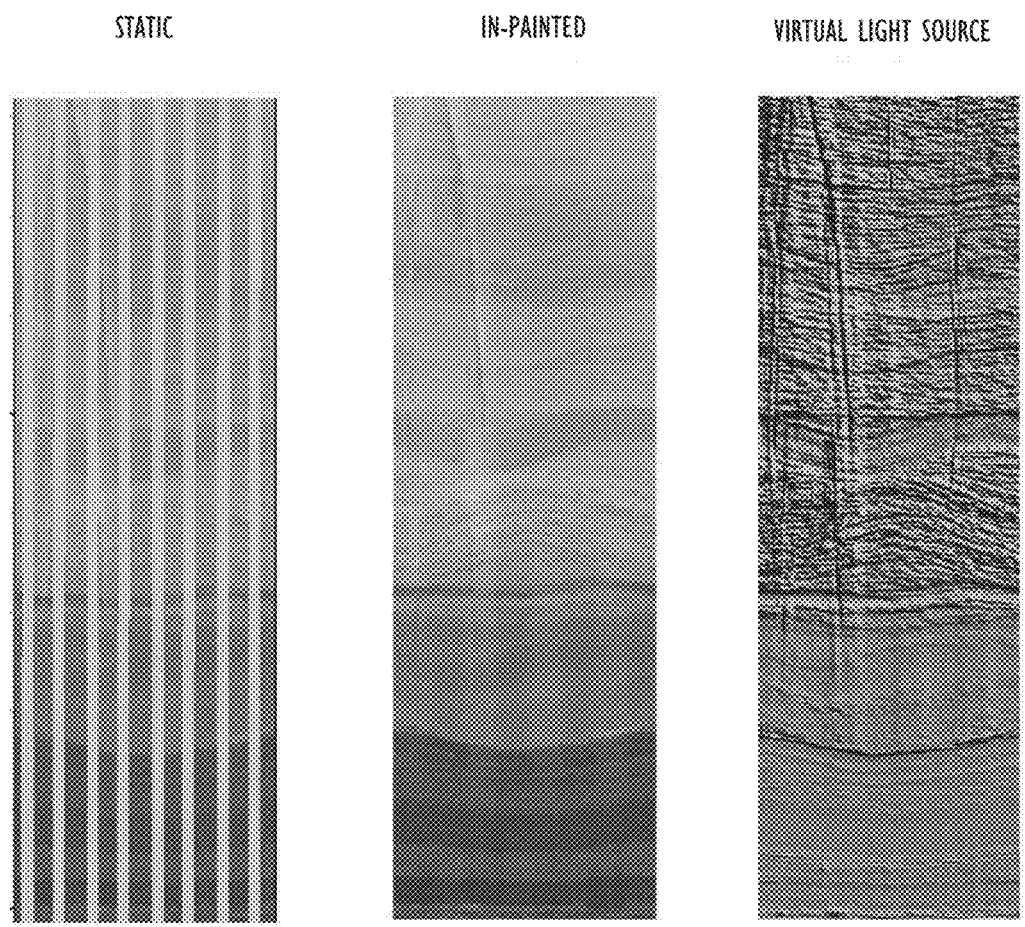
FIGS. 7a to 7c are grayscale representations of comparisons between untreated image log data (FIG. 7a), statically normalized, in-painted log data (FIG. 7b) and log data (FIG. 7c) that have been the subject of Virtual Light Source treatment in accordance with the method of the second aspect of the invention.

This creates a virtual landscape (relief) whose peaks and troughs reflect the amplitude of the underlying resistivity values in a similar way to that in which shining a light onto a landscape casts shadows and gives the result a 3D appearance as shown in FIGS. 7a to 7c. FIG. 7a shows an image derived from untreated log data; FIG. 7b shows a statically normalized in-painted result and FIG. 7c shows a VLS image. The azimuth and the elevation angle of the light source control the nature of the shadows. Features of interest in the image may be optimally illuminated using particular azimuth and elevation angles, thereby providing a mechanism for the preferential selection of features as part of an automated feature recognition process.

Combination of Dynamorphic and VLS (DVLS)

VLS emphasises high spatial frequencies while retaining maximal low spatial frequency information. However, in the implementation described above it does not necessarily preserve the color polarity of the static image. In order to preserve the benefits of VLS and at the same time preserve the color polarity it is possible within the invention to combine VLS and Dynamorphic Normalization. The result is shown in FIG. 8.

High Dynamic Range (HDR) Processing

Figure 9A:
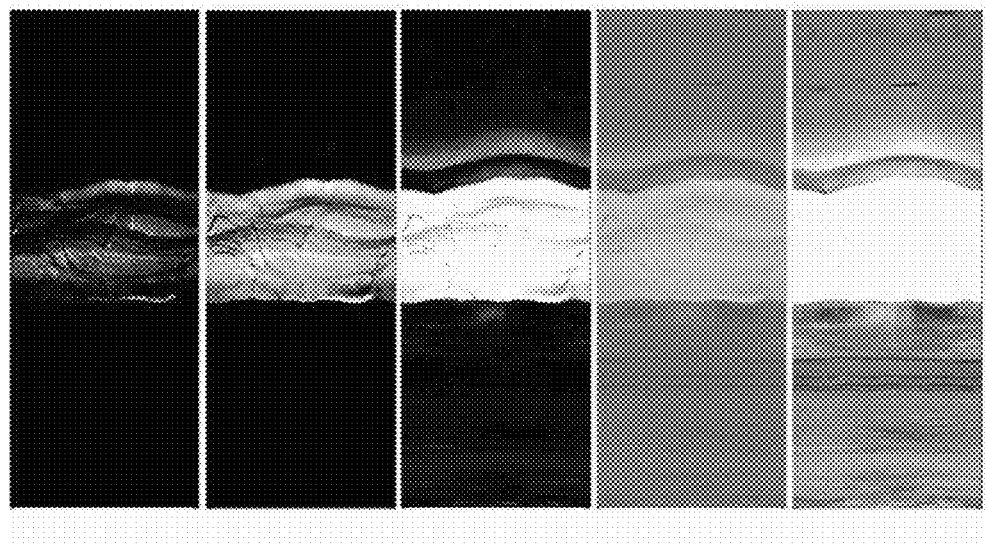
FIG. 9a illustrates in grayscale multiple images created as part of the method of the third aspect of the invention.
Figure 9B:
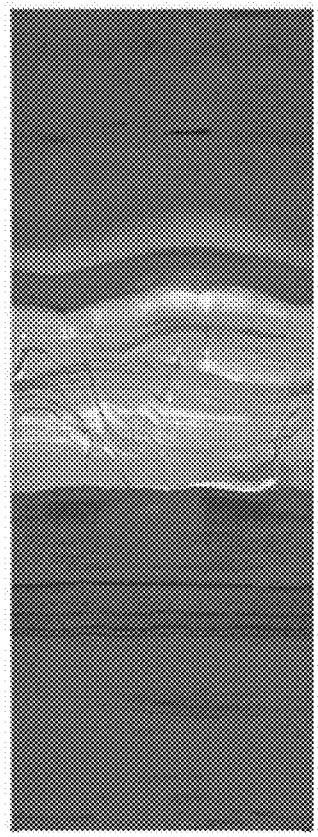

High Dynamic Range processing in accordance with the third aspect of the invention enhances contrast in scenes containing large areas of both light and dark by creating multiple versions of the same image log, each with a different static scale, and then combining the individual images into a single composite as illustrated in FIG. 9a (showing in grayscale the multiple image versions mentioned) and FIG. 9b (showing the composite image log created from them). This process is simpler and faster than the method of the first aspect of the invention, and results are totally free of any artefacts associated with dynamic normalization. It is believed however that in the method of the third aspect of the invention color control is less easy to achieve.

Figure 10A:
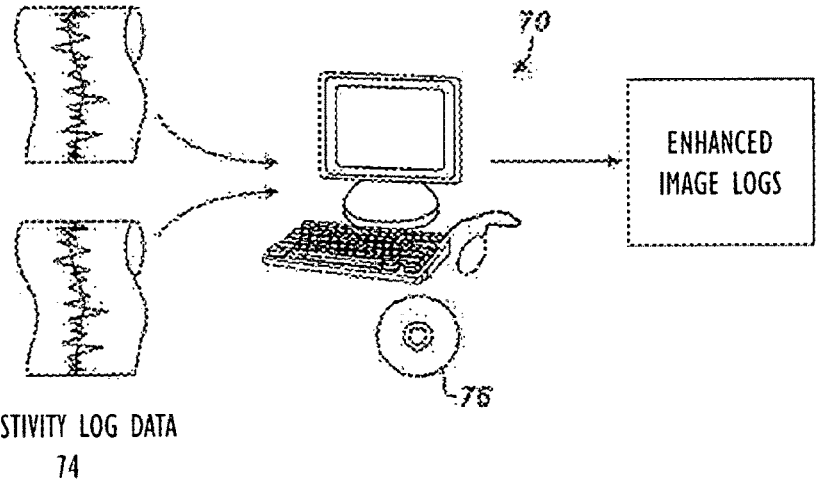
FIGS. 10A-10B each show in schematic form an apparatus used for performing the steps of the methods of the invention.
Figure 10B:
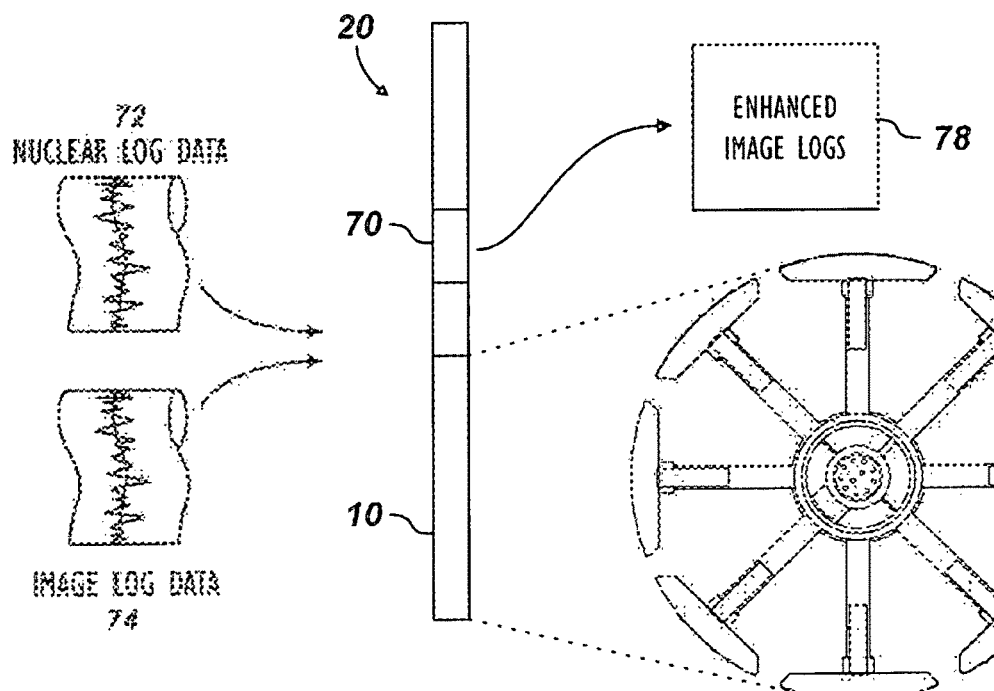

FIGS. 10A-10B show apparatus that may be used in the performance of the methods described herein.

In FIG. 10A, nuclear log data 72, resistivity log data 74 and/or other types of log data such as acoustic log data are fed to a computer or other programmable processing device 70 either directly from a logging tool or wireline connected thereto (as signified by numerals 72 and 74) or via a memory device or medium 76 (that may be associated with or part of a logging tool, or may be separate from it). The computer 70 may perform the steps of the methods described herein in order to produce the enhanced image logs described.

Conveniently as shown in FIG. 10B, the methods of the invention include the steps of operating a logging sonde 10 to energise a geological formation (not shown); receiving returned energy at the sonde 10; from the returned energy generating one or more signals; and transmitting or storing the signals as the borehole log data. The steps of the methods may be carried out using a programmed computer or processor 70.

In addition to the foregoing, the invention is considered to reside in one or more of: a computer or processor 70 that is programmed to perform the steps of a method in accordance with any of the disclosed methods hereof; such a computer or processor 70 when operatively connected to a logging sonde 10; such a computer or processor 70 when housed within a logging sonde 10, or connected as part of a logging toolstring 20 including a sonde 10; log data 72, 74 processed in accordance with the methods hereof; and/or image logs 78 produced in accordance with the methods hereof.

Overall the methods of the invention amount to very significant improvements, as explained, in the quality and usability of image logs, by enhancing the usefulness of the dynamically applied color mapping, by adding in a virtual light source effect and by producing enhanced image logs through the use for the first time on log data of HDR processing techniques. The resulting improved logs may be more effectively assessed and analyzed both by human analysts and by machine vision equipment.

The listing or discussion of an apparently prior-published document in this specification should not necessarily be taken as an acknowledgement that the document is part of the state of the art or is common general knowledge.

What is claimed is:

1. A method of enhancing borehole log data to create one or more enhanced images of the borehole log data for analysis of at least a portion of a borehole intersecting a geological formation, the method comprising the steps of:
   obtaining the borehole log data generated from logging at least the portion of the borehole intersecting the geological formation with a same logging sonde;
   modelling the borehole log data as one input image obtained with the same logging sonde;
   creating multiple versions of the one input image having respectively differing static scales; and
   combining the multiple image versions to create a composite image as the one or more enhanced images of the borehole log data.

2. The method of claim 1, wherein the borehole log data comprise one or more of: resistivity log data, acoustic log data, nuclear log data, and ultrasonic log data.

3. The method of claim 1, further comprising performing histogram equalization.

4. The method of claim 1, wherein obtaining the borehole log data generated by logging at least the portion of the borehole with the same logging sonde comprises the steps of:
   operating the same logging sonde to energize the geological formation;
   receiving returned energy at the same logging sonde;
   generating one or more signals from the returned energy; and
   transmitting or storing the signals as the borehole log data.

5. The method of claim 1, wherein the method is carried out using a programmed computer or processor.

6. The method of claim 1, wherein creating the multiple versions of the one input image having the respectively differing static scales comprises scaling a range of the modelled borehole log data in the one input image with each of the respectively differing static scales.

7. The method of claim 6, wherein combining the multiple image versions to create the composite image as the one or more enhanced images of the borehole log data comprises enhancing contrast of the one input image from the combining of the multiple image versions to create the composite image.

8. A programmable processing device, comprising:
   memory storing borehole log data; and
   a processor programmed to perform a method according to claim 1 of enhancing the borehole log data to create one or more enhanced images of the borehole log data for analysis of at least a portion of a borehole.

9. The device of claim 8, wherein the programmable processing device is operatively connected to a logging sonde.

10. The device of claim 9, wherein the programmable processing device is housed within the logging sonde or is connected as part of a logging toolstring including the logging sonde.

* * * * *